Figure 1:
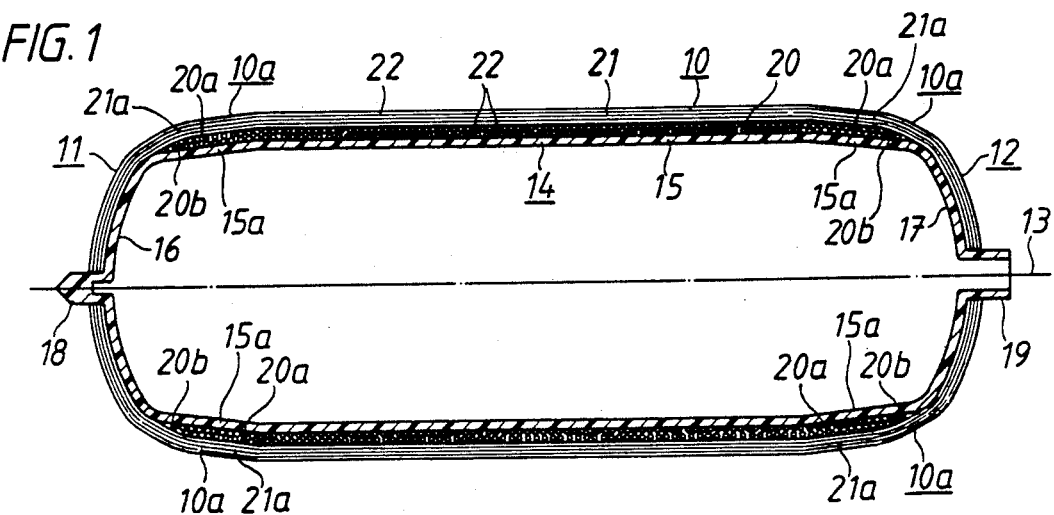

United States Patent [19]

Forsman

[11] Patent Number: 5,025,943

[45] Date of Patent: Jun. 25, 1991

[54] PRESSURE VESSEL HAVING A FILAMENTARY WOUND STRUCTURE

[75] Inventor: Jan-Erik Forsman, Luleå, Sweden

[73] Assignee: ABB Plast AB, Piteaå, Sweden

[21] Appl. No.: 535,972

[22] Filed: Jun. 11, 1990

Related U.S. Application Data

[63] Continuation of Ser. No. 322,105, Mar. 13, 1989, abandoned.

[30] Foreign Application Priority Data

Mar. 15, 1988 [SE] Sweden .............................. 8800917

[51] Int. Cl.$^5$ .............................................. B65D 8/08
[52] U.S. Cl. .................................... 220/589; 220/416; 220/453; 220/455; 220/590
[58] Field of Search .................... 220/414, 3, 453, 455

[56] References Cited

U.S. PATENT DOCUMENTS

| | | | |
|---|---|---|---|
| 2,791,241 | 7/1954 | Reed | 220/3 |
| 3,969,812 | 7/1976 | Beck | 220/3 |
| 4,053,081 | 10/1977 | Minke | 220/3 |
| 4,588,622 | 5/1986 | Sukarie | 220/3 |
| 4,596,619 | 6/1986 | Marks | 220/3 |
| 4,714,094 | 12/1987 | Tovagliaro | 220/414 |
| 4,778,073 | 10/1988 | Ehs | 220/3 |
| 4,785,956 | 11/1988 | Kepler et al. | 220/3 |

FOREIGN PATENT DOCUMENTS

| | | | |
|---|---|---|---|
| 3010958 | 1/1981 | Fed. Rep. of Germany | 220/3 |
| 742605 | 3/1933 | France | 220/3 |
| 1215065 | 4/1960 | France | 220/3 |

Primary Examiner—Stephen Marcus
Assistant Examiner—S. Costellano
Attorney, Agent, or Firm—Watson, Cole, Grindle & Watson

[57] ABSTRACT

A pressure vessel of fibre-reinforced plastic has an essentially cylindrical central portion (10) and two end portions (11, 12) and is preferably provided with a gas-tight liner (14). The central portion comprises a tangential winding (20) of the fibre material, in which the fibre material is oriented in an essentially tangential direction and an axial winding (21), located outside the tangential winding, of fibre material in which the fibre material is oriented in an essentially axial direction and the fibre material of which extends out into and forms a reinforcement of the fibre material in the end portions. The central portion, including its tangential winding and its axial winding, in each of its parts (10a, 20a, 21a) located nearest to an end portion, is formed with a diameter which decreases in a direction towards the end portion. That part (20a) of the tangential winding having a diameter decreasing in a direction towards the end portion preferably has an end (20b) facing the end portion, the wall of the end having an at least substantially wedge-shaped cross-section.

5 Claims, 2 Drawing Sheets

PRESSURE VESSEL HAVING A FILAMENTARY WOUND STRUCTURE

This application is a continuation of application Ser. No. 322,105, filed Mar. 13, 1989, now abandoned.

Pressure vessels of fibre-reinforced resin normally have a cylindrical central portion and two end portions and are normally internally provided with a gas-tight liner. Pressure vessels of this kind are used, inter alia, for storage of compressed gases, such as compressed natural gases for use as fuel for aircraft and vehicles. Compared with pressure vessels of steel or other metallic material, pressure vessels of fibre-reinforced resin have the primary advantage of having a smaller weight. The manufacture of the pressure vessels can be performed by utilizing the liner as a mandrel for winding on the fibre material in the necessary amount.

The central portion of the pressure vessel may be constructed so as to comprise a winding of fibre material, a tangential winding, in which the fibre material is oriented essentially in a tangential direction, and a winding of fibre material, an axial winding, located outside the tangential winding, in which the fibre material is oriented essentially in an axial direction and the fibre material of which extends out into and forms a reinforcement of the fibre material in the end portions.

According to the present invention, it has proved to be possible to produce pressure vessels of the kind mentioned in the preceding paragraph, which are able to withstand a considerably higher pressure than prior art pressure vessels of the same kind and having the same wall thickness. According to the invention, this is achieved by a special design of that part of the central portion, including its tangential winding and its axial winding, which is located nearest to an end portion.

More particularly, the present invention relates to a pressure vessel of fibre-reinforced resin which has an essentially cylindrical central portion and two end portions and the central portion of which comprises a tangential winding of fibre material, in which the fibre material is oriented essentially in a tangential direction as well as an axial winding of fibre material, located outside the tangential winding, in which the fibre material is oriented essentially in an axial direction and the fibre material of which extends out into and forms a reinforcement of the fibre material in the end portions, the invention being characterized in that the central portion, including its tangential winding and its axial winding, in each of its parts located nearest to an end portion, is formed with a diameter which decreases in a direction towards the end portion. By forming that part of the tangential winding, which has a diameter decreasing towards the end portion, with an end facing the end portion, the wall of the end having an at least substantially wedge-shaped cross-section, the transition of the axial winding from the central portion to the end portion can be made even.

The above-mentioned parts on the central portion, including the tangential winding and the axial winding, which have a diameter decreasing towards the end portion preferably make an average angle of 0.5°–10° with generatrices on the central portion which are parallel to the symmetry axis of the central portion, and each part suitably has a length of at least 20 mm, suitably a length of 20–80% of the diameter of the central portion. The parts in question may be straight, the angle then having the stated value. However, they may be slightly curved. In that case the angle of a chord, i.e. a straight connection line between the end points of each part in a plane through the symmetry axis of the central portion, has the stated value, then designated average value. In principle it is possible that each one of the above-mentioned parts on the central portion, in a border-line case, extends out to the centre of the central portion.

The pressure vessel is suitably internally provided with a gas-tight liner.

A possible explanation of the improved strength of a pressure vessel according to the invention is that the stresses in the axial winding in the transition region between the central portion and the end portion are reduced and that these very stresses in the region mentioned are of crucial importance for the pressure which the pressure vessel is able to withstand.

The fibre material which is applied essentially in the tangential direction is preferably arranged in two crossing directions, making an angle of between 80° and 90° with the generatrix of the central portion at each point on the central portion. The fibre material which is essentially applied in the axial direction is also preferably arranged in two crossing directions. These directions preferably make an angle of between 15° and 40° with generatrices which are parallel to the symmetry axis of the central portion.

The fibre material preferably consists of glass fibre but may also consist of fibres of other natural and synthetic materials such as cotton, polyethylene glycol terephthalate, polyacrylo nitrile, polyamide, aramide and carbon. The fibre materials may advantageously be used in the form of threads or strands of the fibres. The fibre material preferably constitutes 55–65% of the total volume of fibre material and resin in the reinforced resin.

The resin used for the reinforced resin in the pressure vessel is preferably a solvent-free curable resin, such as, for example, an unsaturated polyester resin, an epoxy resin, or a polyurethane resin of such types as are conventionally used for the manufacture of fibre-reinforced resin. Both resins which can be cured by heating and resins which can be cured at room temperature may be used. The resin may be supplied to the fibre material in different ways. Thus, the fibre material can be preimpregnated with the resin and the resin possibly be subjected to a partial curing, before the fibre material is shaped to form a pressure vessel, or the fibre material may be impregnated with the resin after the shaping of the fibre material. If the resin is supplied to the fibre material after the pressure vessel has been formed, the impregnation is preferably carried out as a vacuum impregnation. It is also possible to use a thermoplastic resin as resin for the reinforced resin in the pressure vessel. The thermoplastic resin is preferably incorporated into the fibre material prior to the forming of the pressure vessel.

The liner preferably consists of a thermoplastic resin. Many thermoplastic resins have sufficient resistance to deformation in order for liners manufactured thereof to be able to be used as mandrels in building up the fibre material for the pressure vessel around it, especially if the liner is then pressurized with a gas or liquid. As examples of suitable thermoplastic resins may be mentioned polyolefins such as, for example, polyethylene and polypropylene, polyamides such as, for example, nylon 6, further impact resisting polystyrene and thermoplastic polyesters, for example polyethyleneglycol terephthalate. Also cross-linked resins can be used such as, for example, cross-linked silane-grafted polyethylene. The liner is suitably formed by injection moulding or centrifugal casting of the used resin. It is also possible to use liners of metallic material, such as aluminium.

Figure 3:
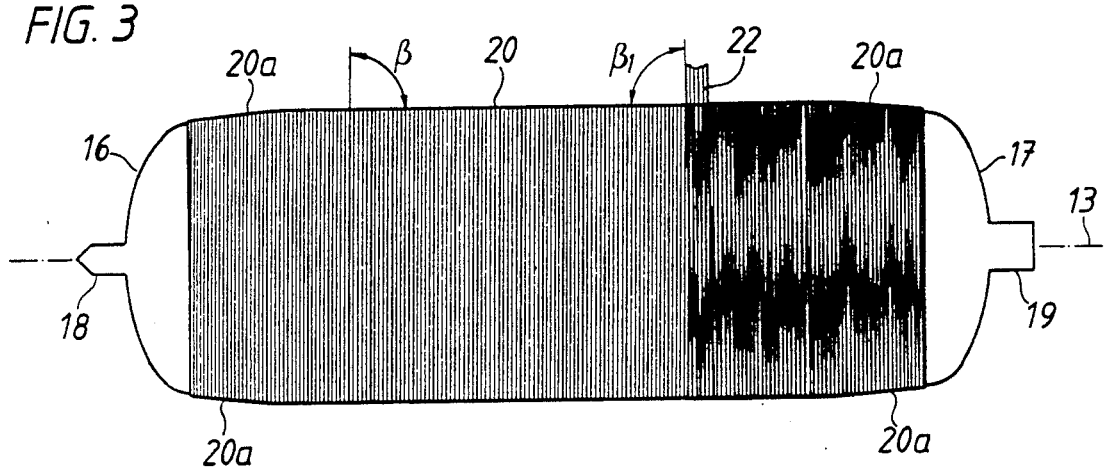
Figure 4:
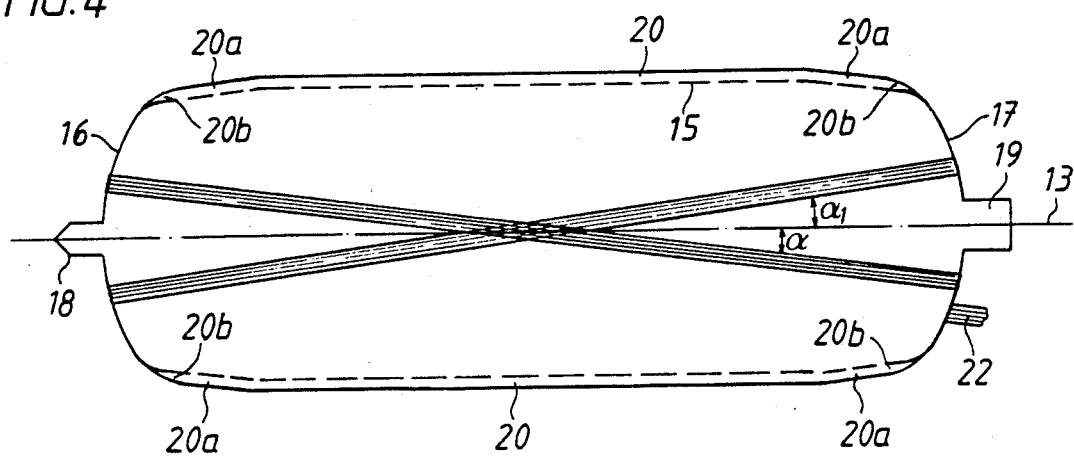
Figure 2:
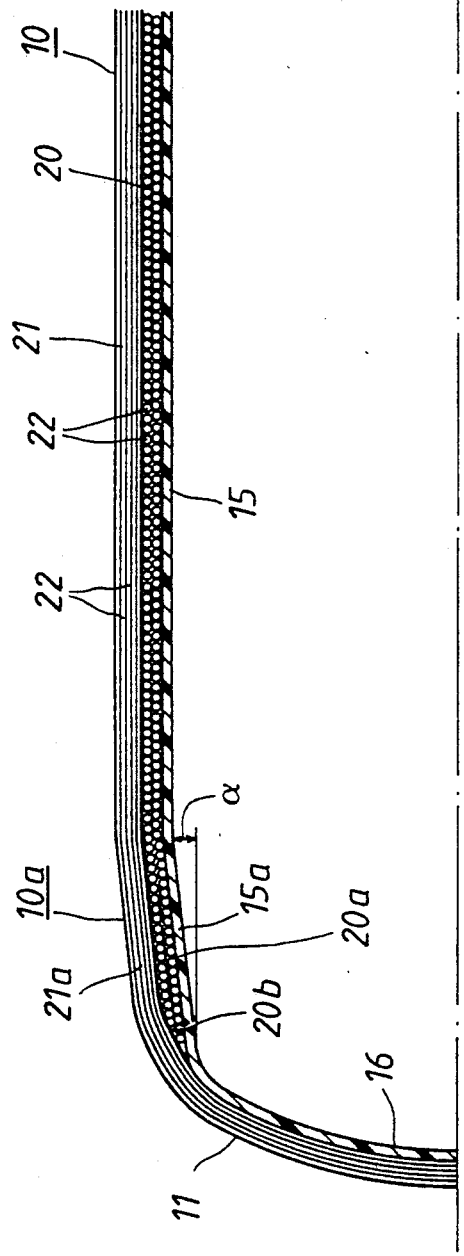

The invention will be explained in greater detail by means of examples with reference to the accompanying drawing, wherein FIG. 1 shows, in an axial longitudinal section, a pressure vessel according to the present invention, FIG. 2 part of the section in FIG. 1, and FIGS. 3 and 4 show a pressure vessel according to FIG. 1 in side view under manufacture.

FIG. 1 shows a pressure vessel for liquids according to the present invention. The pressure vessel is of glass-fibre reinforced resin and has an essentially cylindrical central portion 10 and two end portions 11 and 12. The symmetry axis of the central portion 10 is designated 13. The pressure vessel is provided with a gas-tight liner 14 which has been formed by injection moulding or centrifugal casting of a thermoplastic resin, for example polyethylene. Like the pressure vessel the liner has a central portion 15 and two end portions 16 and 17, respectively. At one end portion the liner 14 is provided with a pin 18 and at the other end portion it is provided with an open connection piece 19. The liner 14 is completely closed, except at the connection piece 19. The central portion 15 of the pressure vessel comprises two layers 20 and 21, respectively, of reinforced resin. The reinforcement in the inner layer, the tangential winding 20, consists of a glass-fibre material wound in multiple layers around the lining in an essentially tangential direction, i.e. the fibre material is oriented at least substantially in a tangential direction. The reinforcement in the outer layer, the axial winding 21, which together with resin also forms the end portions 11 and 12 of the pressure vessel of reinforced resin, consists of glass-fibre material wound in multiple layers around the lining in an essentially axial direction, i.e. the fibre material is oriented at least substantially in the axial direction.

The central portion 10 of the pressure vessel, as well as its tangential winding 20 and its axial winding 21, and the central portion 15 of the liner 14 are arranged, in their parts 10a, 20a, 21a and 15a, respectively, located nearest to an end portion 11, 12, with a diameter which decreases in a direction towards the end portion. As will be clear from FIG. 2, each one of these parts is straight in sections through the symmetry axis 13 of the central portion 10 and makes an angle $\alpha$, which in the exemplified case amounts to 4°, with generatrices of the central portion 10 which are parallel to the symmetry axis 13 of the central portion. The part 10a, as well as parts 20a and 21a, have a length of 30 mm. The part 20a of the tangential winding has an end 20b facing the end portion 11, 12, the wall of that end having an at least substantially wedge-shaped cross-section.

In the manufacture of the pressure vessel, the liner 14, for example in the form of a centrifugally cast or injection moulded liner of polyethylene, can be used as a mandrel for building up the reinforcement of the pressure vessel. The liner 14 therefore has the same external shape as the internal shape the pressure vessel is to have. This means that those parts 15a of the central portion 15 of the liner which are located nearest the end portions 16 and 17 of the liner, in the same way as the parts 10a, 20a and 21a of the central portion 10, the tangential winding 20 and the axial winding 21, respectively, are formed with a diameter which decreases in a direction towards the nearest end portion. In the manufacture of the pressure vessel, the liner is placed with the pin 18 and the connection piece 19 between two rotatable pins (not shown). The rotatable pin 18 connected to the connection piece 19 is provided with a nipple through which the liner can be pressurized, for example by nitrogen gas. When the liner has been pressurized by gas, for example to a pressure of 0.2 MPa, the fibre material 22, for example glass-fibre roving with a weight of 2400 g per km and a diameter of 20 μm of the individual fibre, is first wound around the liner in accordance with FIG. 3 in a large number of turns until a tangential winding 20 with the intended thickness has been obtained. The winding is preferably made with an even thickness along its entire length including the parts 20a, except in their furthermost ends 20b, which are formed so that their walls are given a wedge-shaped cross-section. During the application, the liner is rotated around the symmetry axis 13 while moving a feeding device (not shown) for the fibre material 22 in an axial direction in a reciprocating movement. The angle $\beta$ between the fibre material and the generatrices of the central portion then amounts to between 80° and near 90° during the forward movement. For pressure vessels with large diameters, the angle $\beta$ may be greater than 89° but it is always smaller than 90°. The angle $\beta_1$ during the return movement is equal to the angle $\beta$. FIG. 3 shows the state when the second layer of the fibre material is being applied on the liner. The fibre material, which is schematically shown by small circles 22 in FIGS. 1 and 2, becomes oriented in an essentially tangential direction in the winding. The fibre material is impregnated with an epoxy resin before being applied around the liner. The epoxy resin may consist of 100 parts by weight of a resin built up of bisphenol A (e.g. XB 3052A from Ciba AG) and 38 parts by weight curing agent of amine type (e.g. XB 3052B from Ciba AG).

After the application of the winding 20, the same fibre material 22 as has been used for the winding 20 is wound around the liner in a manner illustrated in FIG. 4. In this figure, the central portion 15 (not shown) of the liner 14 is shown with a dashed line. The glass-fibre material which is preimpregnated with epoxy resin, as in the previous case, is applied with the glass fibres oriented essentially in the axial direction of the pressure vessel in a large number of layers to form an axial winding 21 which surrounds the winding 20 and the end portions 16 and 17 of the liner. FIG. 4 shows only two turns of the fibre material under application of the first layer on the liner and on the winding 20. Also the application of this winding is performed under rotation of the liner and movement of the feeding device for the fibre material in an axial direction in a reciprocating movement, so that the angle $\alpha$ between the fibre material and the generatrices of the central portion amounts to between 15° and 40° during the forward movement. The angle $\alpha_1$ during the return movement is equal to the angle $\alpha$. After an additional amount of fibre material has been wound on the liner, the resin is cured, suitably at 80° C. for about 2 hours, after which time the reinforced pressure vessel with its liner is completed.

As an example of a suitable unsaturated polyester resin to be used instead of the exemplified polyester resin can be mentioned a resin containing 57 parts by weight of a reaction product of maleic acid, isophthalic acid and neopentyl glycol, whereby 1.5 mole isophthalic acid and 2.7 moles neopentyl glycol are used per mole of maleic acid, and further containing 42 parts by weight styrene and 1 part by weight benzoyl peroxide. The curing can be performed at 120° for 3 hours.

The thickness of the liner may advantageously amount to 1-5 mm, whereas the thickness of the walls of the pressure vessel may advantageously amount to 4-20 mm at the central portion 10 and to 2-10 mm at the end portions 11 and 12. In the exemplified case the central portion of the pressure vessel has a diameter of 100 mm.

I claim:

1. A pressure vessel of a fibre-reinforced resin, which has an essentially cylindrical central portion and two domed end portions, the central portion of which comprises a tangential winding of fibre material, in which the fibre material is oriented essentially in a tangential direction, and an axial winding, located outside said tangential winding, of fibre material in which the fibre material is oriented in an essentially axial direction and the fibre material of which forms a reinforcement of the fibre material in the domed end portions; wherein the central portion, its tangential winding and its axial winding each have two end parts, each end part adjoining a respective end portion and formed with an internal diameter which decreases in a direction towards the respective end portion; wherein each end part of the tangential winding has an end facing the respective domed end portion, each said end facing the respective domed end portion having an at least substantially wedge-shaped cross-section; and wherein each end part of the central portion, tangential winding and axial winding, respectively, in at least substantially its entire extension forms an angle of 0.5°-10° with generatrices on the central portion which are parallel to an axially oriented symmetry axis of the central portion.

2. A pressure vessel as claimed in claim 1, in which each of the end parts of the central portion, tangential winding and axial winding located near an end portion is straight in sections through the axially oriented symmetry axis of the central portion.

3. A pressure vessel as claimed in claim 1, in which each of the end parts of the central portion, tangential winding and axial winding located nearest to an end portion has an axial length of 20-80% of the central portion.

4. A pressure vessel according to claim 1 characterized in that each one of the end parts of the central portion, the tangential winding (20) and the axial winding, has an axial length of at least 20 mm.

5. A pressure vessel according to claim 1 characterized in that it is internally provided with a gas-tight liner which makes contact with the inner surfaces of the pressure vessel.

* * * * *